US009118873B2

(12) United States Patent
Marumoto et al.

(10) Patent No.: US 9,118,873 B2
(45) Date of Patent: Aug. 25, 2015

(54) IMAGING DEVICE, IMAGE READING APPARATUS, IMAGE FORMING APPARATUS, AND IMAGE READING METHOD

(71) Applicants: Kohei Marumoto, Kanagawa (JP); Masamoto Nakazawa, Kanagawa (JP); Masaki Nagase, Kanagawa (JP)

(72) Inventors: Kohei Marumoto, Kanagawa (JP); Masamoto Nakazawa, Kanagawa (JP); Masaki Nagase, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/482,515

(22) Filed: Sep. 10, 2014

(65) Prior Publication Data

US 2015/0098117 A1    Apr. 9, 2015

(30) Foreign Application Priority Data

Oct. 8, 2013  (JP) ................................. 2013-211058

(51) Int. Cl.
    *H04N 1/407* (2006.01)
    *H04N 1/60* (2006.01)

(52) U.S. Cl.
    CPC .................................... *H04N 1/6002* (2013.01)

(58) Field of Classification Search
    CPC ............................. H04N 1/6002; H04N 1/407
    USPC .................... 358/518, 505, 474, 754
    See application file for complete search history.

(56) References Cited

U.S. PATENT DOCUMENTS

| | | | |
|---|---|---|---|
| 8,908,245 B2* | 12/2014 | Nakazawa | .................... 358/518 |
| 2003/0025817 A1 | 2/2003 | Yonemoto et al. | |
| 2006/0072169 A1* | 4/2006 | Ishiguro et al. | ............... 358/494 |
| 2007/0188638 A1 | 8/2007 | Nakazawa et al. | |
| 2008/0231918 A1 | 9/2008 | Nagase | |
| 2008/0252787 A1 | 10/2008 | Nakazawa et al. | |
| 2008/0297616 A1 | 12/2008 | Nagase et al. | |
| 2009/0059324 A1 | 3/2009 | Nagase et al. | |
| 2009/0213261 A1 | 8/2009 | Nagase et al. | |
| 2010/0027061 A1 | 2/2010 | Nakazawa | |

(Continued)

FOREIGN PATENT DOCUMENTS

| | | |
|---|---|---|
| JP | 10-126697 | 5/1998 |
| JP | 2010-171521 | 8/2010 |

(Continued)

OTHER PUBLICATIONS

U.S. Appl. No. 14/302,737, filed Jun. 12, 2014.

(Continued)

*Primary Examiner* — Houshang Safaipour
(74) *Attorney, Agent, or Firm* — Oblon, McClelland, Maier & Neustadt, L.L.P.

(57) ABSTRACT

An imaging device includes photoelectric conversion elements arranged unidirectionally for each color of light to be received, and performing photoelectric conversion of reflected light from an approximately same position of an object for the each color sequentially pixel by pixel; and a black correction unit that corrects a black level of the object with respect to a pixel group including some photoelectric conversion elements in a way that an output result of the photoelectric conversion of reflected light by a photoelectric conversion element for a pixel, independent of the reflected light, is subtracted from another output result of photoelectric conversion of reflected light by the photoelectric conversion element for the same pixel.

12 Claims, 17 Drawing Sheets

(56) References Cited

U.S. PATENT DOCUMENTS

| | | |
|---|---|---|
| 2010/0171998 A1 | 7/2010 | Nakazawa |
| 2010/0182472 A1 | 7/2010 | Yamagata et al. |
| 2010/0231979 A1 | 9/2010 | Nagase et al. |
| 2011/0026083 A1 | 2/2011 | Nakazawa |
| 2011/0051201 A1 | 3/2011 | Hashimoto et al. |
| 2011/0063488 A1 | 3/2011 | Nakazawa |
| 2011/0187910 A1 | 8/2011 | Nikai |
| 2012/0008173 A1 | 1/2012 | Konno et al. |
| 2012/0062962 A1 | 3/2012 | Nagase |
| 2012/0092732 A1 | 4/2012 | Nakazawa |
| 2012/0224205 A1 | 9/2012 | Nakazawa |
| 2013/0010164 A1 | 1/2013 | Nikai |
| 2013/0063792 A1 | 3/2013 | Nakazawa |
| 2014/0029065 A1 | 1/2014 | Nakazawa |
| 2014/0204427 A1 | 7/2014 | Nakazawa |
| 2014/0204432 A1 | 7/2014 | Hashimoto et al. |
| 2014/0211273 A1 | 7/2014 | Konno et al. |

FOREIGN PATENT DOCUMENTS

| | | |
|---|---|---|
| JP | 2011-097528 | 5/2011 |
| JP | 2011-160116 | 8/2011 |
| JP | 2012-235297 | 11/2012 |

OTHER PUBLICATIONS

U.S. Appl. No. 14/301,488, filed Jun. 11, 2014.

* cited by examiner

IMAGE SIGNAL OF EACH PIXEL

IMAGE SIGNAL OF EACH PIXEL

IMAGE SIGNAL OF EACH PIXEL

IMAGING DEVICE, IMAGE READING APPARATUS, IMAGE FORMING APPARATUS, AND IMAGE READING METHOD

CROSS-REFERENCE TO RELATED APPLICATION

The present application claims priority to and incorporates by reference the entire contents of Japanese Patent Application No. 2013-211058 filed in Japan on Oct. 8, 2013.

BACKGROUND OF THE INVENTION

1. Field of the Invention

The present invention relates to an imaging device, an image reading apparatus, an image forming apparatus, and image reading method.

2. Description of the Related Art

An image reading apparatus reads a document image by irradiating a document by a light source such as an LED, and converting the reflected light from the document to an image signal by an image sensor, and a CMOS image sensor, for example, has been known as one of such image reading apparatuses. There are factors to deteriorate the quality of the image read by the CMOS image sensor, and a known factor is fixed pattern noise that occurs due to variation of each pixel. When the fixed pattern noise is present, a resulting image after reading shall include vertical lines.

The variation of each pixel in the CMOS image sensor includes, for example, variation in dark current of floating diffusion (FD) which functions as an electric charge detecting unit, variation in offset voltage of a pixel transistor, and variation in dark current (current generated even when there is no exposure of light) of a photo diode. Meanwhile, as a method for correcting the fixed pattern noise, a correlation double sampling (CDS) technique for correcting a black level is known by taking a difference between an optical signal level and a reference level including a dark current or the like.

Japanese Laid-open Patent Publication No. 10-126697 discloses a solid state image sensor configured to obtain a reference signal for correcting vertical lines of fixed pattern noise. In the solid state image sensor, a timing generator outputs a substrate pulse immediately before a pixel signal is read, in order to reset a pixel transistor. An operating pulse is then raised quickly in a condition where no light incidence signal is present. Accordingly, a pixel signal is read from the pixel transistor via an operating switch and held in a capacitor, and a horizontal scanning pulse is output from a horizontal shift resistor to electrically connect a horizontal switch one by one in the horizontal image period to output the signal sequentially from the capacitor.

In an area sensor in the past, however, spectral filters of R, G, and B colors are installed for each photo diode in a Bayer arrangement or other type of arrangement. Therefore, the area sensor in the past is unable to read data of multiple colors at the same pixel position, and such data of multiple colors are read at different positions and synthesized in image processing as data of a pixel. Since the area sensor in the past cannot handle the data of multiple colors synthesized for the same pixel position by the same black correction circuits, there has been a problem that a correction error occurs between colors due to the variation of black correction circuits.

Therefore, there is a need to provide an imaging device, an image reading apparatus, an image forming apparatus, and an image reading method that are capable of performing black level correction without generating a correction error between colors at approximately the same pixel position.

SUMMARY OF THE INVENTION

It is an object of the present invention to at least partially solve the problems in the conventional technology.

According to an embodiment, there is provided an imaging device that includes a plurality of photoelectric conversion elements that are arranged unidirectionally for each color of light to be received, and that perform photoelectric conversion of reflected light from an approximately same position of an object to be read for the each color sequentially pixel by pixel; and a black correction unit that corrects a black level of the object to be read with respect to a pixel group including some of the photoelectric conversion elements to perform photoelectric conversion of reflected light from an approximately same position for the each color in a way that an output result of the photoelectric conversion of reflected light by a photoelectric conversion element for a pixel, independent of the reflected light, is subtracted from another output result of photoelectric conversion of reflected light by the photoelectric conversion element for the same pixel.

According to another embodiment, there is provided an image reading apparatus that includes the imaging device according to the above embodiment; a light source that emits light to a document as the object to be read; and a control unit that controls the black correction unit to correct the black level of the document each time the imaging device receives reflected light from a single line of the document in a main-scanning direction.

According to still another embodiment, there is provided an image forming apparatus that includes the image reading apparatus according to the above embodiment; and an image forming unit that forms an image read by the image reading apparatus.

According to still another embodiment, there is provided an image reading method that includes performing photoelectric conversion of reflected light from an approximately same position of an object to be read for each color sequentially pixel by pixel by a plurality of photoelectric conversion elements arranged unidirectionally for each color of light to be received; and correcting a black level of the object to be read with each pixel group including some of the photoelectric conversion elements to perform photoelectric conversion of reflected light from an approximately same position for the each color in a way that an output result of the photoelectric conversion of reflected light by a photoelectric conversion element for a pixel, independent of the reflected light, is subtracted from another output result of photoelectric conversion of reflected light by the photoelectric conversion element for the same pixel.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments

Figure 1:
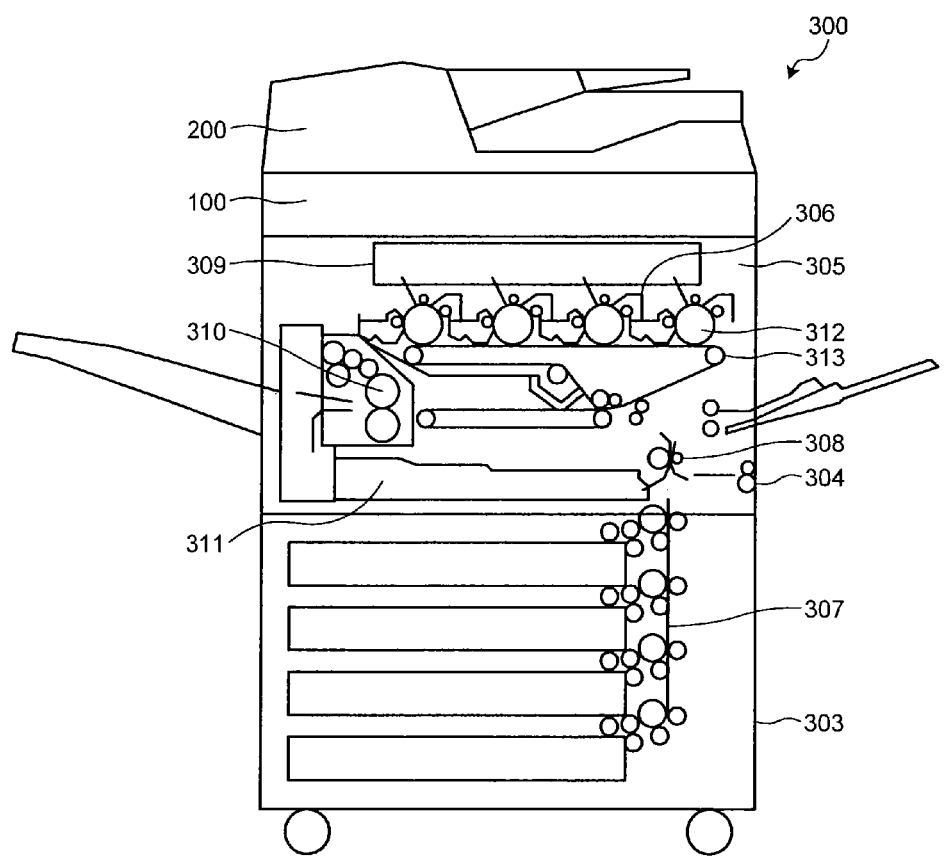
FIG. 1 is a configuration diagram illustrating an exemplary structure of an image forming apparatus according to an embodiment.

An image forming apparatus according to embodiments will be described below by referring to the accompanying drawings. FIG. 1 is a configuration diagram illustrating an exemplary structure of an image forming apparatus 300 according to an embodiment. The image forming apparatus 300 is configured as a digital copying machine and includes a paper feeder 303 and a body 304 of the image forming apparatus, with an image reading apparatus 100 and an automatic document feeder (ADF) 200 mounted thereon.

In the body 304 of the image forming apparatus, a tandem image forming unit 305, a resist roller 308 which transports recording papers supplied from the paper feeder 303 via a transport path 307 to the image forming unit 305, an optical writing device 309, a fixing and transporting unit 310, and a duplex tray 311 are provided.

In the image forming unit 305, four photoreceptor drums 312 are provided in parallel corresponding to four color toners of Y, M, C, and K colors. Image forming elements including a charger, a developing device 306, a transfer unit, a cleaner, and a destaticizer are arranged around each photoreceptor drum 312.

An intermediate transfer belt 313 is pinched in a nip between the transfer unit and the photoreceptor drum 312 and stretched between a driven roller and a follower roller.

In a tandem image forming apparatus 300 having been structured as above, optical writing is performed in the corresponding photoreceptor drum 312 for each of Y, M, C, and K colors. Each toner is developed by the developing device 306, and a developed image is primarily transferred onto an intermediate transfer belt 313 for Y, M, C, and K toners in this order.

A full color image formed by layering four colors by the primary transfer in the image forming apparatus 300 is then transferred onto a recording paper by secondary transfer, fixed, and discharged to provide a full color image on the recording paper. The image forming apparatus 300 forms an image read by the image reading apparatus 100 on the recording paper.

Figure 2:
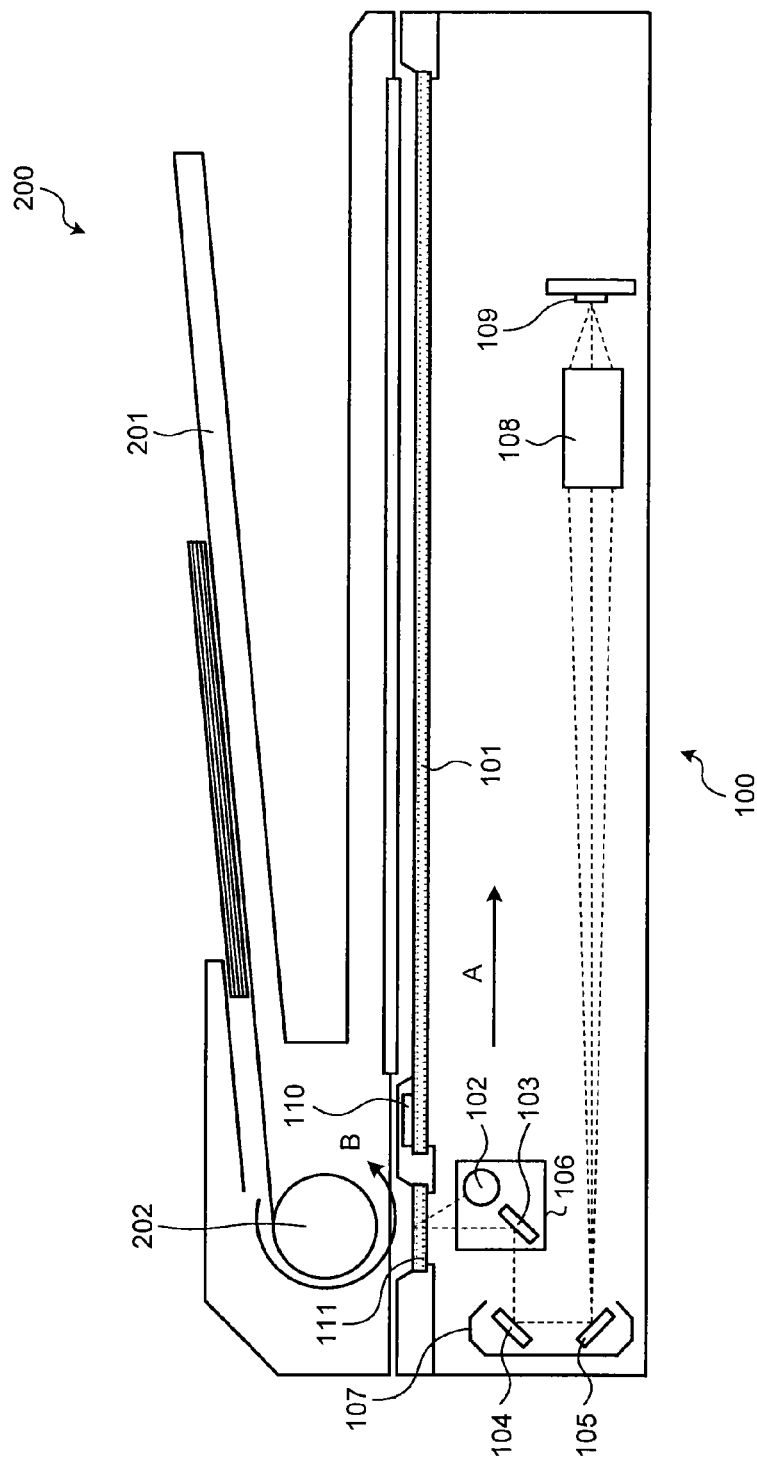
FIG. 2 is a configuration diagram illustrating an exemplary structure of an image reading apparatus and an ADF.

FIG. 2 is a configuration diagram illustrating an exemplary structure of an image reading apparatus 100 and the ADF 200. The image reading apparatus 100 is a scanner device installed on the image forming apparatus such as a digital copying machine, a digital multifunction peripheral, or a facsimile machine. The image reading apparatus 100 may also be formed as a scanner device alone. The image reading apparatus 100 illuminates a document, which is provided as an object (object to be read), with light from a light source. The light is reflected from the document and received by a CMOS image sensor to provide a signal which is then processed to read the image data of the document.

Specifically, as illustrated in FIG. 2, the image reading apparatus 100 includes a contact glass 101 on which the document is placed, a first carriage 106 including a light source 102 for exposing the document and a first reflection mirror 103, and a second carriage 107 including a second reflection mirror 104 and a third reflection mirror 105. The image reading apparatus 100 also includes a CMOS image sensor (imaging device) 109, a lens unit 108 for imaging on the CMOS image sensor 109, a reference white board (white reference board) 110 used to correct various distortions caused by a reading optical system or the like, and a sheet-through type reading slit 111.

An ADF 200 is installed on the upper part of the image reading apparatus 100 and connected thereto by a hinge or the like, which is not illustrated, to allow opening and closing of the ADF 200 relative to the contact glass 101.

The ADF 200 includes a document tray 201 provided as a document mounting stand on which a bundle of documents including more than one documents can be placed. The ADF 200 also includes separation and feeding means including a feeding roller 202 which automatically feeds documents from the bundle of documents placed on the document tray 201 by separating the documents one after another toward a sheet-through type reading slit 111.

In a scan mode where an image of the document is read by scanning an image surface of the document, the image reading apparatus 100 scans the document in a direction indicated by arrow A (sub-scanning direction) by the first carriage 106 and the second carriage 107 using a stepping motor which is not illustrated. At this time, the second carriage 107 moves at half the speed of the first carriage 106 to maintain a constant distance of a light path length between the contact glass 101 and the CMOS image sensor 109.

Simultaneously, the image surface, which is a lower surface of the document set on the contact glass 101, is illuminated (exposed) by the light source 102 of the first carriage 106. Accordingly, an image of the reflected light from the image surface is fed to the first reflection mirror 103 of the first carriage 106, the second and third reflection mirrors 104 and 105 of the second carriage 107, and a lens unit 108 sequentially to reach the CMOS image sensor 109 where an image is formed.

The CMOS image sensor 109 performs photoelectric conversion to output a signal which is then converted to a digital signal. Thus, image reading of the document is performed to obtain digital image data.

Meanwhile, in a sheet-through mode where the document image is read by automatically feeding the documents, the first carriage 106 and the second carriage 107 are moved below the sheet-through type reading slit 111. Accordingly, the documents placed on the document tray 201 are automatically fed in the direction (sub-scanning direction) indicated by an arrow B by the feeding roller 202, and scanned at the position of the sheet-through type reading slit 111.

At this time, the lower surface (image surface) of the automatically-fed document is illuminated by the light source 102 of the first carriage 106. An image of the reflected light from the image surface is sequentially fed to the first reflection mirror 103 of the first carriage 106, the second and third reflection mirrors 104 and 105 of the second carriage 107, and the lens unit 108 to reach the CMOS image sensor 109 where an image is formed. The CMOS image sensor 109 performs photoelectric conversion to output a signal which is then converted to a digital signal. Thus, image reading of the document is performed to obtain digital image data. When the image reading is complete, the document is discharged to a discharging outlet which is not illustrated.

Before the start of the image reading in the scan mode or the sheet-through mode, the light source 102 illuminates the reference white board 110 which reflects light to the CMOS image sensor 109 where the signal is converted into an analog signal and to the digital signal. Thus, according to a reading result (digital signal) of the reference white board 110, shading correction is performed during the image reading of the document.

When the ADF 200 includes a transport belt, the image of the document can be read by automatically feeding the document to a reading position on the contact glass 101 by the ADF 200 even in the scan mode.

Figure 3:
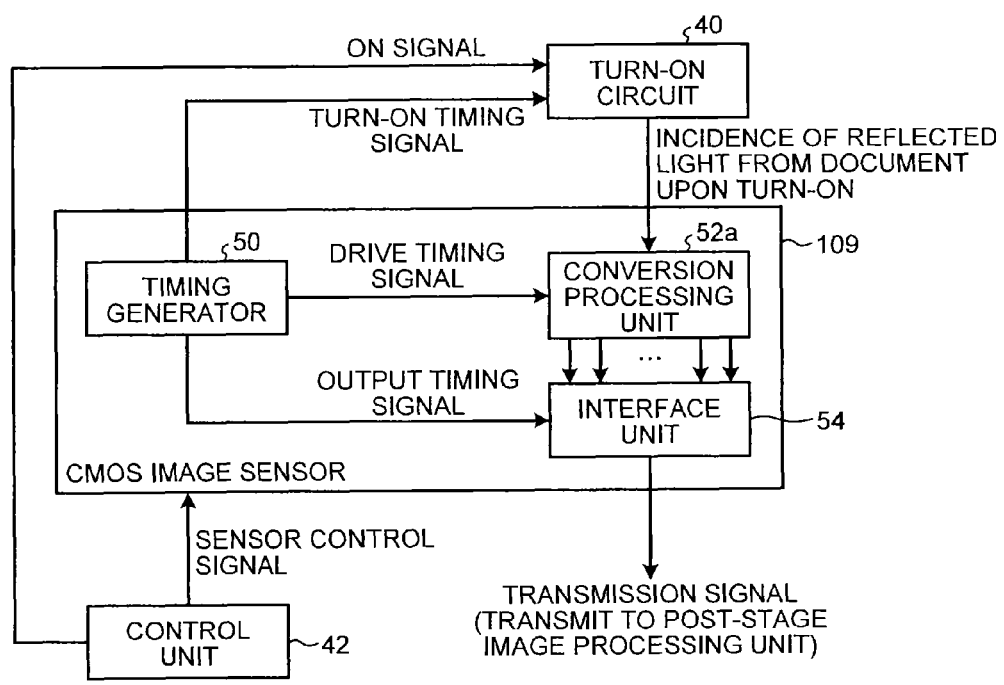
FIG. 3 is a block diagram illustrating an example of CMOS image sensor and a peripheral structure thereof.

Next, the CMOS image sensor 109 and a peripheral part thereof will be described. FIG. 3 is a block diagram illustrating an example of CMOS image sensor 109 and a peripheral structure thereof. As illustrated in FIG. 3, a turn-on circuit 40 and a control unit 42 are provided in the periphery of the CMOS image sensor 109.

The turn-on circuit 40 has the light source 102 such as an LED and turns on the light source 102 of FIG. 2 according to control by the control unit 42. The control unit 42 is configured to control components of the image reading apparatus 100, and includes a central processing unit (CPU) which is not illustrated, a ROM that stores a program to be executed by the CPU, and a RAM that temporarily stores data.

The CMOS image sensor 109 includes a timing generator (TG) 50, a conversion processing unit 52a, and an interface (I/F) unit 54. The timing generator 50 generates timing signals to set operation timings of the turn-on circuit 40, the conversion processing unit 52a, and the I/F unit 54. Various types of timing are set in response to a control signal from the control unit 42.

When an ON signal from the control unit 42 is asserted, the turn-on circuit 40 turns on the light source 102 according to the turn-on timing signal from the timing generator 50. Upon turn-on of the light source 102 by the turn-on circuit 40 during the document reading, reflected light from the document is incident on the CMOS image sensor 109.

The conversion processing unit 52a includes a photoelectric conversion element, such as a photo diode (PD) which will be described later, to store electric charges corresponding to the reflection light from the document and outputs a signal corresponding to the electric charge to the I/F unit 54.

The I/F unit 54 transfers an image signal of each pixel (which will be described later by referring to FIG. 4) to an image processing unit in the post-stage which is not illustrated. The image processing unit performs shading correction to normalize the image data of the document according to the image data read from the reference white board, and corrects variations in the main-scanning direction, such as variation in sensitivity of the CMOS image sensor 109 or uneven light distribution of the optical system.

Figure 4:
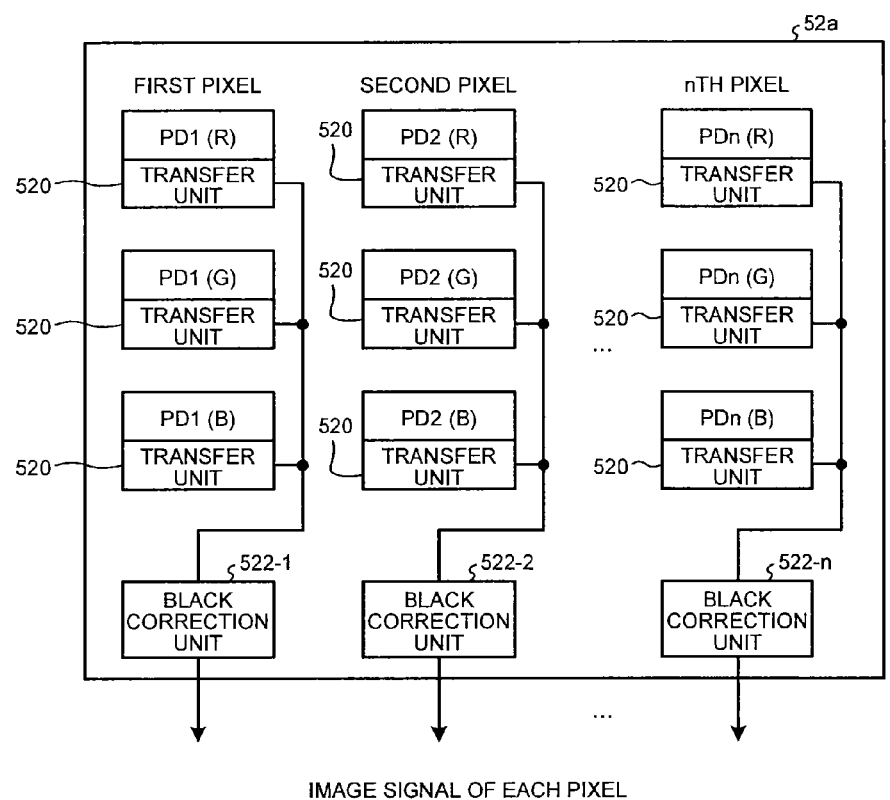
FIG. 4 is a block diagram illustrating an overall conversion processing unit.

FIG. 4 is a block diagram illustrating an overall conversion processing unit 52a. As illustrated in FIG. 4, the conversion processing unit 52a includes photo diodes PD1(R) to PDn(R) provided with a filter to receive color light of R, photo diodes PD1(G) to PDn(G) provided with a filter to receive color light of G, and photo diodes PD1(B) to PDn(B) provided with a filter to receive color light of B. The photo diodes are arranged unidirectionally for each color. Specifically, the PDs of R, G, and B colors are arranged in the main-scanning direction for n pixels. Each pixel includes a transfer unit 520 that transfers, as an electric current, electric charges stored in the photo diode (PD) by photoelectric conversion.

Color pixels of the same main-scanning direction are collected as a pixel group (column) and subjected to black correction (black level correction: see FIG. 8) by a common black correction unit 522. For example, the PD1(R), the PD1(G), and the PD1(B) are grouped as a column. A signal is subjected to photoelectric conversion through each of the PD1(R), PD1(G), and PD1(B), and is sequentially subjected to black correction by a black correction unit 522-1. Specifically, the conversion processing unit 52a includes n pixels for each color arranged unidirectionally and n black correction units 522 that perform black correction. Herein, a plurality of components having substantially the same function, such as the PD1(R) to PDn(R) and the black correction units 522-1 to 522-n, are simply referred to as the PD and the black correction unit 522, unless any one of them is otherwise specified.

Thus, the common black correction unit 522 of the conversion processing unit 52a performs black correction for each column of color pixels of the same (or substantially the same) main-scanning direction. The conversion processing unit 52a, therefore, can perform the black level correction for the same pixel position of the object to be read, without generating a correction error between colors caused by the variation of the black correction unit 522. Each of the color pixels of the same main-scanning direction outputs a signal to be combined to represent the color of the common (same) pixel position of the object to be read.

Figure 5:
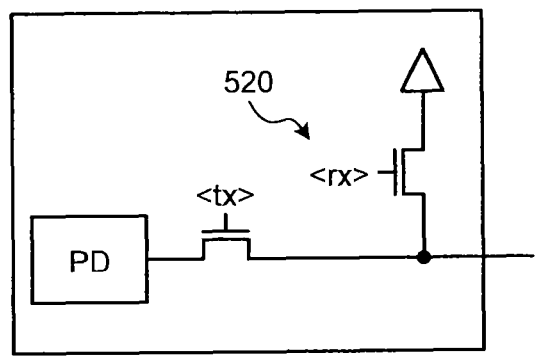
FIG. 5 illustrates the detailed structure of a transfer unit and a PD.

FIG. 5 illustrates the detailed structure of the transfer unit 520 and the PD. The transfer unit 520 includes a transfer transistor, an amplifying transistor, etc. When a signal <tx> is asserted, the signal that has been photoelectrically converted by the PD is output to the black correction unit 522. When a signal <rx> is asserted, the transfer unit 520 outputs a reference signal level to the black correction unit 522. When the signals tx and rx are simultaneously asserted, the transfer unit 520 resets signals stored in the PD.

The transfer unit 520 transfers the signals at the same timing for each column. A timing signal rx_r, tx_r represents the timing signal for R pixels, a timing signal rx_g, tx_g represents the timing signal for G pixels, and a timing signal rx_b, tx_b represents the timing signal for B pixels.

Figure 6:
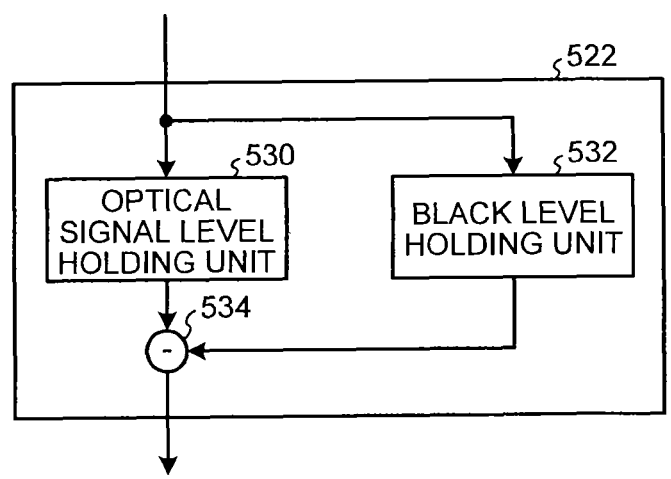
FIG. 6 illustrates an exemplary structure of a black correction unit.

FIG. 6 illustrates an exemplary structure of the black correction unit 522. The black correction unit 522 includes an optical signal level holding unit 530, a black level holding unit 532, and a subtracting unit 534. The optical signal level holding unit 530 holds an optical signal level after photoelectric conversion by the PD. The black level holding unit 532 holds the black level as a reference level. The subtracting unit 534 calculates a difference between the optical signal level and the black level, and outputs the calculated difference to the I/F unit 54 as a corrected black level.

Figure 7:
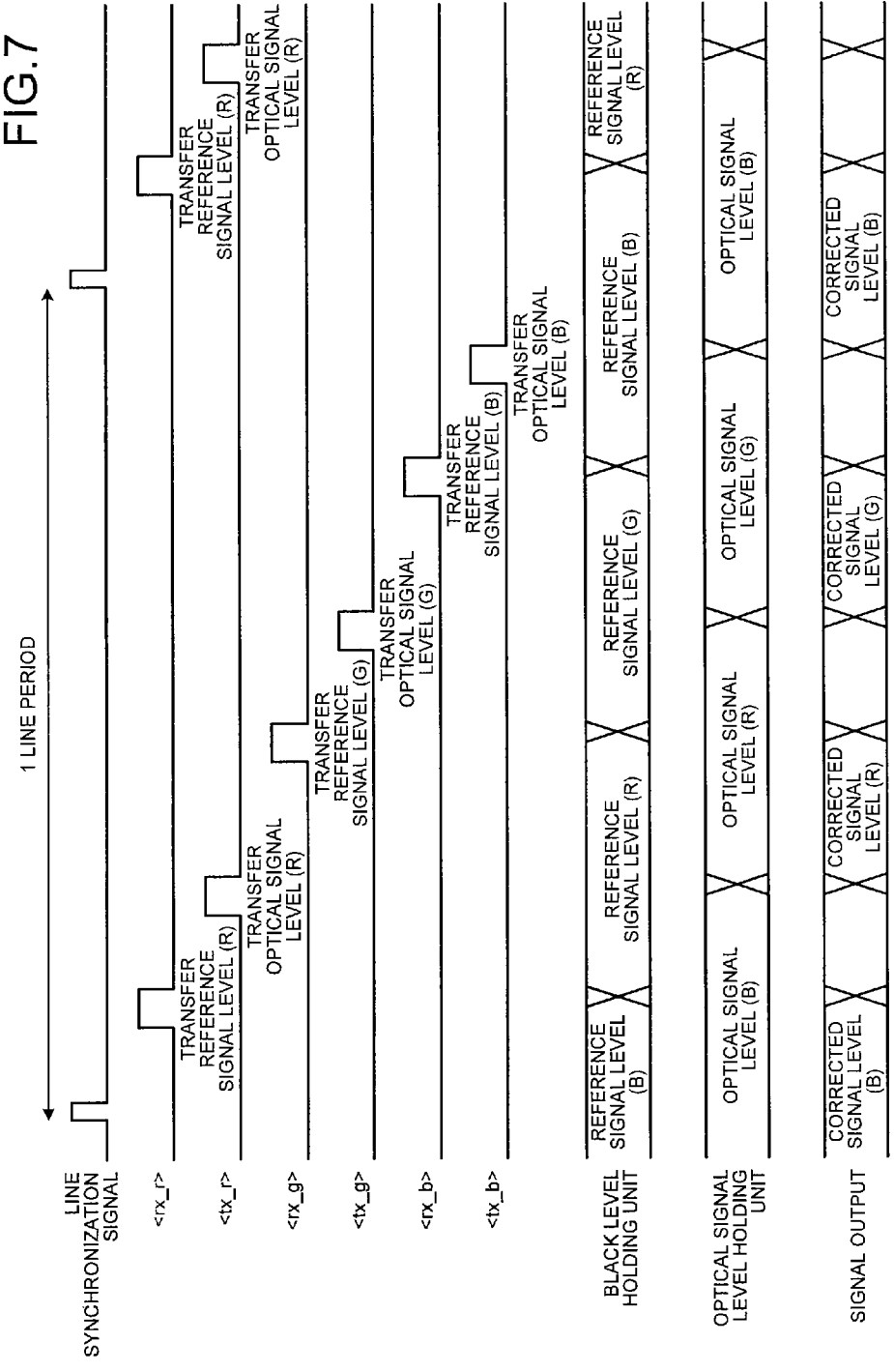
FIG. 7 is a timing chart illustrating an operation of the CMOS image sensor during performance of black level correction.

FIG. 7 is a timing chart illustrating the operation of the CMOS image sensor 109 during performance of black level correction. As described above, the CMOS image sensor 109 operates in response to the timing signal output from the timing generator 50.

The CMOS image sensor 109 sequentially transfers and processes the reference level and the optical signal level of pixels for each of the R, G, and B colors, for a single line of the image in the main-scanning direction. The black level holding unit 532 takes in the signal at the timing of transfer of the reference signal level, and updates the signal sequentially for each color. The optical signal level holding unit 530 takes in the signal at the timing of transfer of the optical signal level after photoelectric conversion by the PD, and updates the signal sequentially for each color. The subtracting unit 534 calculates a difference between the signals (difference between the optical signal level and the black level) updated by the black level holding unit 532 and the optical signal level holding unit 530. The CMOS image sensor 109 sequentially outputs a corrected signal level for each color.

Figure 8:
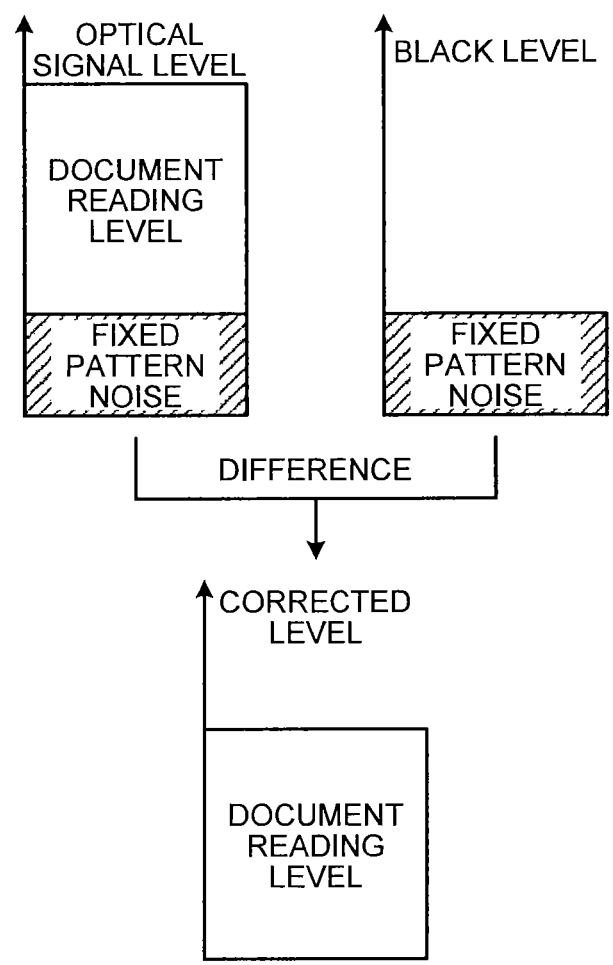
FIG. 8 is a schematic diagram illustrating the black level correction performed by the CMOS image sensor.

FIG. 8 is a schematic diagram illustrating the black level correction performed by the CMOS image sensor 109. The level held by the optical signal level holding unit 530 includes the reading level according to the reflected light from the document and the fixed pattern noise. The black level holding unit 532 holds the fixed pattern noise level. The fixed pattern noise includes the variation in the dark current of the floating diffusion (FD) acting as the electric charge detecting unit, which is not illustrated, of the CMOS image sensor 109, the variation in the offset voltage of the pixel transistor, the variation in the dark current of the photo diode, etc.

The CMOS image sensor 109 subtracts the fixed pattern level from the reading level including the fixed pattern noise to obtain a corrected document reading level. Since the CMOS image sensor 109 performs the black correction on the output from the color pixels of the same main-scanning direction by using the common black correction unit 522, the occurrence of the correction error between colors caused by the variation of the black correction unit 522 or the like on the same pixel position of the object to be read can be prevented. Specifically, as the pixels to be composed on the same position are processed by the common black correction unit 522, no error occurs between colors. Further, since the CMOS image sensor 109 does not process different colors at the same timing, coloring or uneven colors due to inter-color crosstalk can be restricted. Since the CMOS image sensor 109 is controlled to perform the black correction at least once, for example, in reading a single line of the image, a decrease in quality of the reading image can be prevented even when a temperature change occurs over time.

In contrast, the area sensor in the past (such as a second dimensional CMOS image sensor in the Bayer arrangement), which is a comparative example, includes circuits for performing the black correction (black correction circuits) provided for each row or column of pixels, and the black correction is performed by a different black correction circuit for each color at the same pixel position of the object to be read.

Specifically, the area sensor in the past represents the color of the same pixel position of the object to be read by combining pixel data of each color including the correction error between colors caused by, for example, the variations of the black correction circuits. Therefore, the black correction cannot be performed accurately as in the CMOS image sensor 109. The area sensor in the past also processes different colors at the same timing, which leads to the occurrence of coloring or uneven colors due to the inter-color crosstalk.

In the CMOS image sensor 109 described above, exposure timing is different in the column due to a rolling shutter system. The CMOS image sensor 109 may adopts a global shutter system in which exposure is performed at the same timing for all pixels by providing a memory for holding signals from each pixel, for example, in the previous stage of the black correction unit 522.

Figure 9:
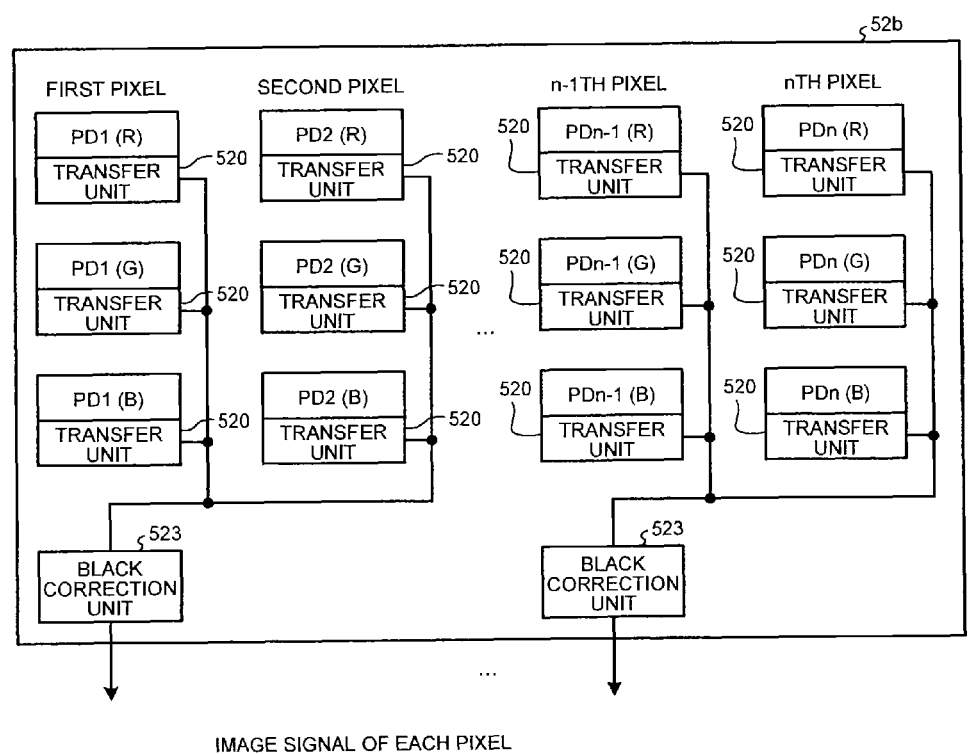
FIG. 9 is a block diagram illustrating an overall structure of a first modification of the conversion processing unit.

First Modification of Conversion Processing Unit 52a: Conversion Processing Unit 52b Next, a first modification of the conversion processing unit 52a will be described. FIG. 9 is a block diagram illustrating an overall structure of the first modification (conversion processing unit 52b) of the conversion processing unit 52a. Similar components substantially the same as those described above will be indicated by the same reference numerals.

The conversion processing unit 52b is configured such that the output from two PDs for each color (equivalent to a total of six pixels) is subjected to the black correction by a black correction unit 523. The black correction unit 523 performs the black correction using input signals, as in the black correction unit 522. Specifically, in the CMOS image sensor (imaging device) having n pixels photo diodes (n is an even number) for each color, six pixels including even numbered pixels and odd numbered pixels of R, G, and B, are formed as a column, and each column is subjected to the black correction by n/2 black correction units 523. Accordingly, a circuit area, such as an area of the black correction units, can be reduced.

The number of pixels included in the column may not be limited to three pixels or six pixels in the case where the pixels for each color of the same main-scanning direction are grouped as a column to which the black correction is performed for each column by the black correction unit 522 (or black correction unit 523).

Figure 10:
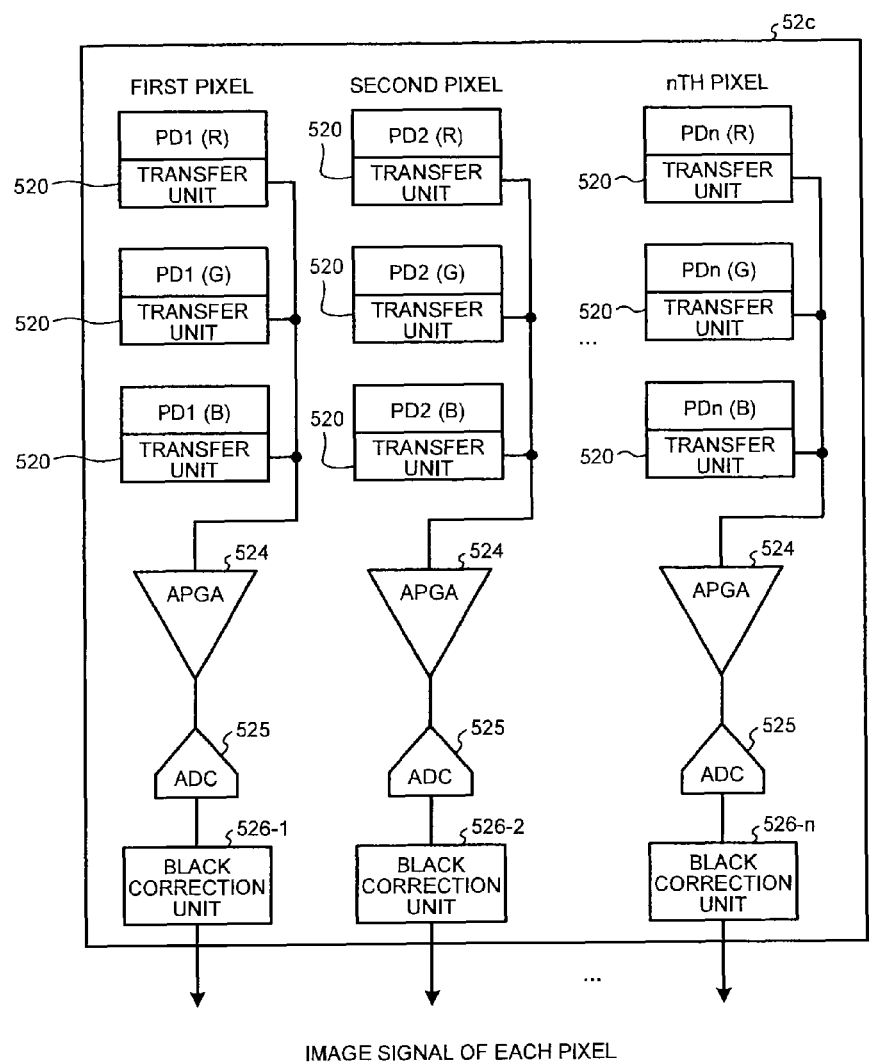
FIG. 10 is a block diagram illustrating an overall structure of a second modification of the conversion processing unit.

Second Modification of Conversion Processing Unit 52a: Conversion Processing Unit 52c Next, a second modification of the conversion processing unit 52a will be described. FIG. 10 is a block diagram illustrating an overall structure of the second modification (conversion processing unit 52c) of the conversion processing unit 52a. In the conversion processing unit 52c, color pixels of the same main-scanning direction are grouped as a column. The conversion processing unit 52c is configured such that the signal, which has been subjected to photoelectric conversion by each PD and transferred by the transfer unit 520, is amplified by a common analog programmable gain amplifier (APGA) 524 for each column, and converted to a digital signal by an analog-to-digital (AD) converter (ADC) 525 to a digital signal to which the black correction is performed by the black correction unit 526. Similar to the black correction units 522, n black correction units 526 are provided, one for each column, to perform the black correction.

Specifically, the conversion processing unit 52c can obtain the corrected document reading level by subtracting the fixed pattern noise caused by variations of the FD, the pixel transistor, or the ADC 525. The conversion processing unit 52c can also increase a gradation characteristic of the image or the correction accuracy by arbitrarily amplifying signals, which are sequentially transferred from each of the transfer units 520, by the APGA 524 to allow effective use of the dynamic range of the ADC 525.

Next, the correction of the fixed pattern noise that should occur due to the variation in the dark current (current generated during non-exposure of light) of the photo diode will be described. Black shading correction is a method for correcting the fixed pattern noise caused by variation in the dark current of the photo diode. Specifically, an image is read when the light source is turned off, and a reading result is held as a reference black level for each pixel. The reference black level is then subtracted from an image level obtained by reading the document to thereby perform the correction.

Because of the need for reading the image by turning off the light source before reading (scanning) the image, the black shading correction, however, may lower productivity of continuous scanning. If the reference black level for the black shading correction is generated just once in the beginning, the productivity of continuous scanning may be improved. If, however, the fixed pattern noise changes due to a temperature change or the like over time, the correction cannot be performed normally.

In order to correct the fixed pattern noise including the variations due to the temperature change or the like over time, while maintaining the productivity, a technique to correct the reference black level value by detecting variation of the reading level of a light shading pixel (OPB) of the image sensor has already been known. In the method of correcting the reference black level value by detecting the variation of the reading level of the OPB, however, the variation of the fixed pattern noise may change for each pixel if the temperature change over time does not uniformly occur for each pixel. Accordingly, the correction is prohibited and vertical lines may be included in the image.

Third Modification of Conversion Processing Unit 52*a*: Conversion Processing Unit 52*d*

Figure 11:
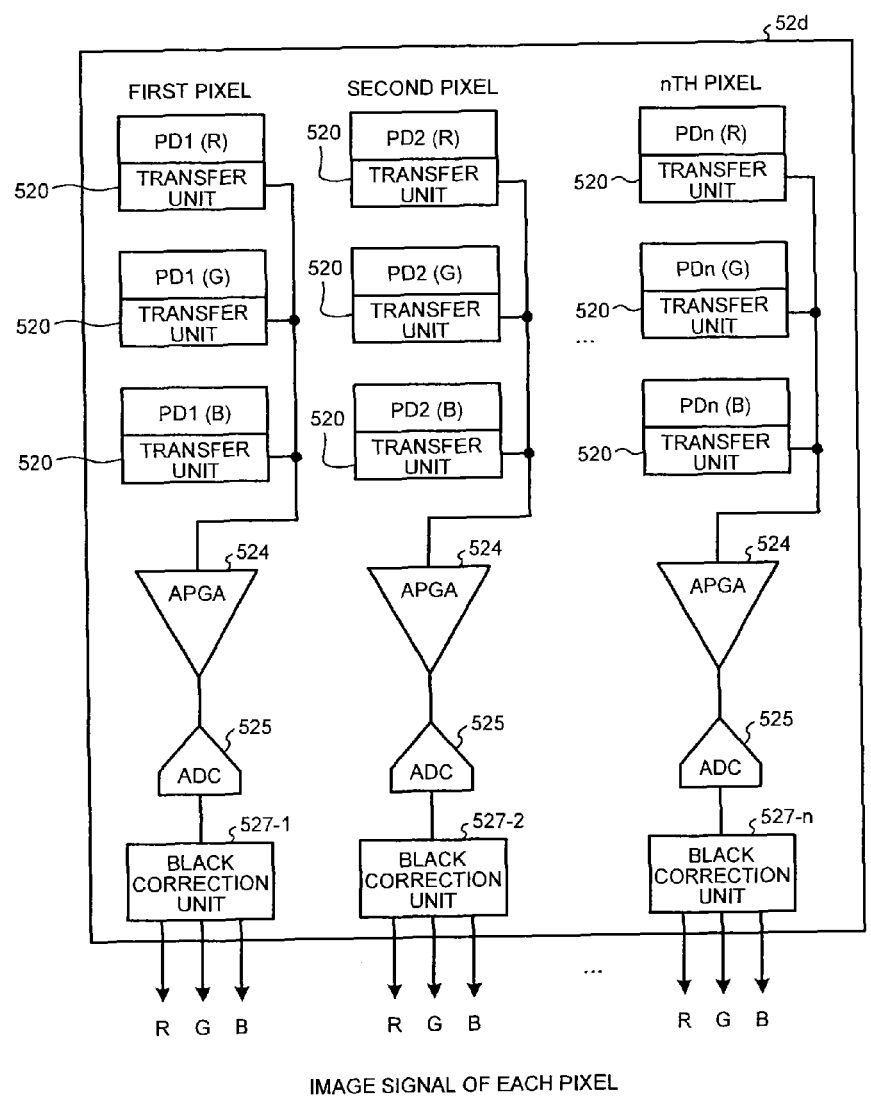
FIG. 11 is a block diagram illustrating an overall structure of a third modification of the conversion processing unit.

Next, a third modification of the conversion processing unit 52*a*, which allows correction of the fixed pattern noise caused by the variation in the dark current of the photo diode will be described. FIG. 11 is a block diagram illustrating an overall structure of the third modification (conversion processing unit 52*d*) of the conversion processing unit 52*a*. As illustrated in FIG. 11, the conversion processing unit 52*d* includes the APGA the ADC 525, and a black correction unit 527 for each of n columns, with each column including three pixels. The conversion processing unit 52*d* is configured such that a signal level of a turn-off period, during which a single line of the image is read in the main-scanning direction, is used as the reference signal level for the black correction.

Figure 12:
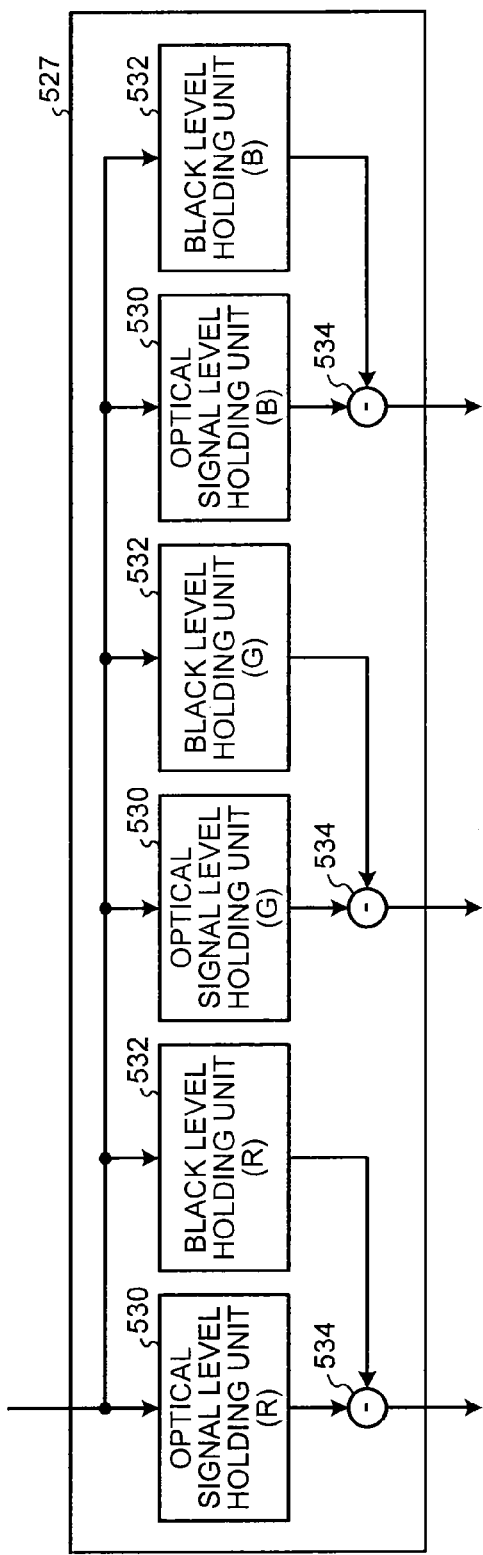
FIG. 12 illustrates an exemplary structure of the black correction unit.

FIG. 12 illustrates an exemplary structure of the black correction unit 527. As illustrated in FIG. 12, the black correction unit 527 includes the optical signal level holding unit 530, the black level holding unit 532, and the subtracting unit 534 for each of the R, G, and B signals. Specifically, the black correction unit 527 takes a difference between the optical signal level and the black level for each color, and outputs a black-level-corrected signal for each color.

Figure 13:
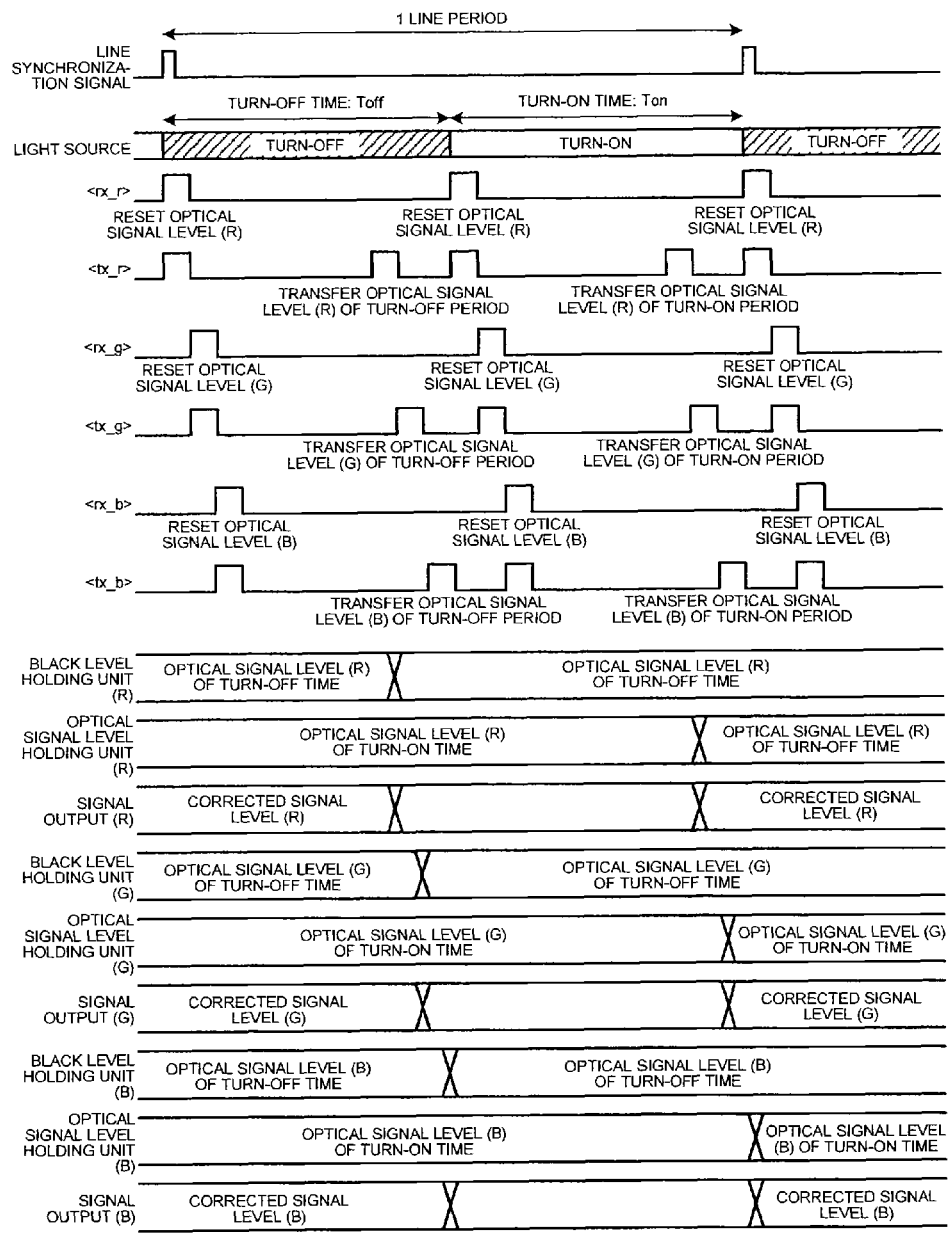
FIG. 13 is a timing chart illustrating an operation of an image reading apparatus during performance of the black level correction.

FIG. 13 is a timing chart illustrating the operation of the image reading apparatus 100 including the CMOS image sensor 109 with the conversion processing unit 52*d* of FIG. 11 during performance of the black level correction. In this case, the CMOS image sensor 109 also operates, as described above, in response to respective timing signals output from the timing generator 50.

The turn-on circuit 40 (FIG. 3) switches on and off of the light source 102 sequentially when reading the document. For example, the turn-on circuit 40 may provide the same length of time of a turn-on time Ton and a turn-off time Toff during the reading of a single line of the image in the main-scanning direction.

During the turn-off period, the control unit 42 first resets the optical signal level of the PD in the conversion processing unit 52*d* sequentially in turn for each color. After a specific time has passed, the conversion processing unit 52*d* transfers the optical signal level stored during the turn-off period to the black level holding unit 532 (FIG. 12).

During the turn-on period, the control unit 42 first resets the optical signal level of the PD in the conversion processing unit 52*d* sequentially in turn for each color. After a specific time has passed, the conversion processing unit 52*d* transfers the optical signal level stored during the turn-on period to the optical signal level holding unit 530.

The conversion processing unit 52*d* then performs the black correction by an operation of the subtracting unit 534 for each color, and sequentially outputs corrected signals. The color signals are transferred to an image processing unit in the post-stage by the I/F unit 54 as image signals.

Thus, the image reading apparatus 100 including the CMOS image sensor 109 with the conversion processing unit 52*d* can obtain the corrected document reading level by subtracting the fixed pattern noise caused by variations of the dark current of the FD, the pixel transistor, the APGA 524, the ADC 525, and the PD. The image reading apparatus 100 can prevent a decrease in quality of the reading image even when a temperature change occurs over time, because the black correction is performed each time a single line of the image is read. The image reading apparatus 100 can also prevent coloring (false color) or uneven color due to the crosstalk that affects other colors via the power source or GND, because the signals are transferred at the same timing for each color.

Fourth Modification of Conversion Processing Unit 52*a*: Conversion Processing Unit 52*e*

Figure 14:
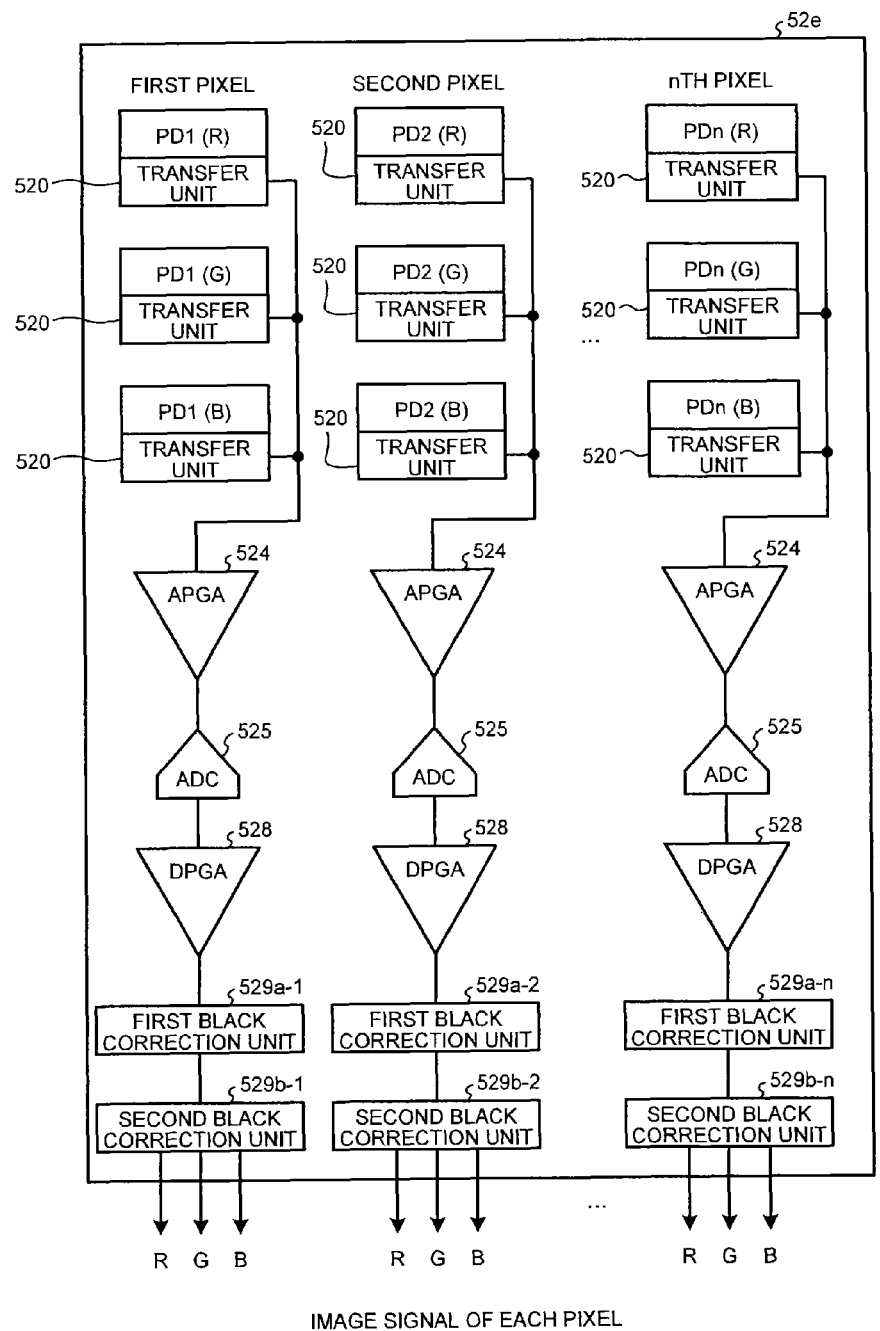
FIG. 14 is a block diagram illustrating an overall structure of a fourth modification of the conversion processing unit.

Next, a fourth modification of the conversion processing unit 52*a* will be described. FIG. 14 is a block diagram illustrating an overall structure of the fourth modification (conversion processing unit 52*e*) of the conversion processing unit 52*a*. As illustrated in FIG. 14, the conversion processing unit 52*e* differs from the conversion processing unit 52*d* of FIG. 11 in that a digital programmable gain amplifier (DPGA) 528 and two black correction units including a first black correction unit 529*a* and a second black correction unit 529*b* are provided for each column of pixels in which the number of columns is the same as the number of color pixels.

The DPGA 528 performs digital amplification of a digital signal after the A/D conversion by the ADC 525 with an arbitrary gain. The first black correction unit 529*a* and the black correction unit 522 of FIG. 6 have the same structure. The first black correction unit 529*a* is used to correct the fixed pattern noise caused by the variations of the FD, the pixel transistor, and the ADC 525. The second black correction unit 529*b* and the black correction unit 527 of FIG. 12 have the same structure. The second black correction unit 529*b* is used to correct the fixed pattern noise caused by the variation in the dark current of the PD.

Figure 15:
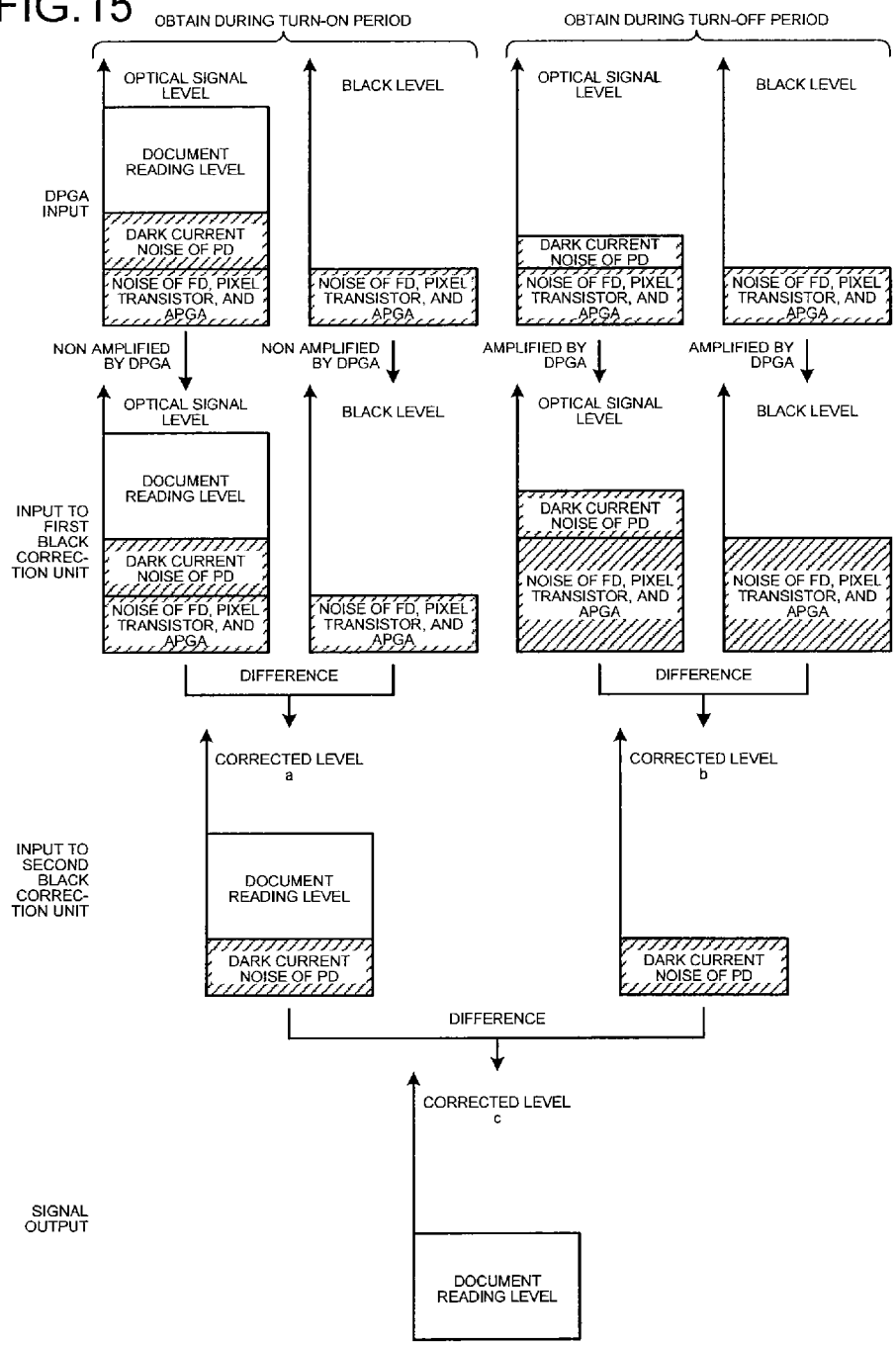
FIG. 15 is a schematic diagram illustrating the black level correction performed by the image reading apparatus that includes the CMOS image sensor having the conversion processing unit.

FIG. 15 is a schematic diagram illustrating the black level correction performed by the image reading apparatus 100 including the CMOS image sensor 109 with the conversion processing unit 52*e*. The conversion processing unit 52*e* obtains the optical signal level and the black level during each of the turn-on period and the turn-off period.

The optical signal level obtained by the conversion processing unit 52*e* during the turn-on period includes the reading level corresponding to the reflected light from the document and the fixed pattern noise caused by the FD, the pixel transistor, the APGA 524, and the PD. The black level obtained by the conversion processing unit 52e during the turn-on period is the fixed pattern noise caused by the FD, the pixel transistor, and the APGA 524.

The optical signal level obtained by the conversion processing unit 52e during the turn-off period includes the fixed pattern noise caused by the FD, the pixel transistor, the APGA 524, and the PD. As the turn-off period is short, the level of the fixed pattern noise caused by the dark current of the PD during the turn-off period is lower than that of the turn-on period. The black level obtained by the conversion processing unit 52e during the turn-off period is the fixed pattern noise caused by the FD, the pixel transistor, and the APGA 524.

The DPGA 528 changes the gain between the turn-on period and the turn-off period to provide the same fixed pattern noise caused by the dark current of the PD in the turn-on period and the turn-off period. For example, by setting a one-fold gain for the turn-on period, the DPGA 528 provides the gain for the turn-off period according to a ratio of the turn-on time Ton to the turn-off time Toff to equalize the fixed pattern noise caused by the dark current of the PD.

The first black correction unit 529a takes a difference between the optical signal level and the black level during each of the turn-on period and the turn-off period, to correct the fixed pattern noise caused by the FD, the pixel transistor, and the APGA 524. The second black correction unit 529b corrects the fixed pattern noise caused by the dark current of the PD by taking a difference between the signals during the turn-on and turn-off periods. Thus, the image reading apparatus 100 including the CMOS image sensor 109 with the conversion processing unit 52e allows lowering the ratio of the turn-off period Toff compared to the CMOS image sensor 109 with the conversion processing unit 52d.

In the second black correction unit 529b, the gain of the DPGA 528 has to be set to equalize the dark current noise. The gain setting of the DPGA 528 may be calculated according to the driving condition or by adjusting the gain. When the gain setting of the DPGA 528 is calculated according to the driving condition, the setting may be calculated, for example, according to a ratio of the turn-on period to the turn-off period of the light source 102. Since the dark current noise is proportional to the storage time, by setting the gain of the DPGA 528 to be equivalent to the ratio of the turn-on period to the turn-off period, the dark current noise can be equalized between a corrected level a and a corrected level b, and a corrected level c can be calculated. The gain of the DPGA 528 can be calculated by Equation (1) below.

$$\text{Gain of the DPGA } \mathbf{528} = \text{turn-on period/turn-off period} \quad (1)$$

Modification of CMOS Image Sensor 109

Figure 16:
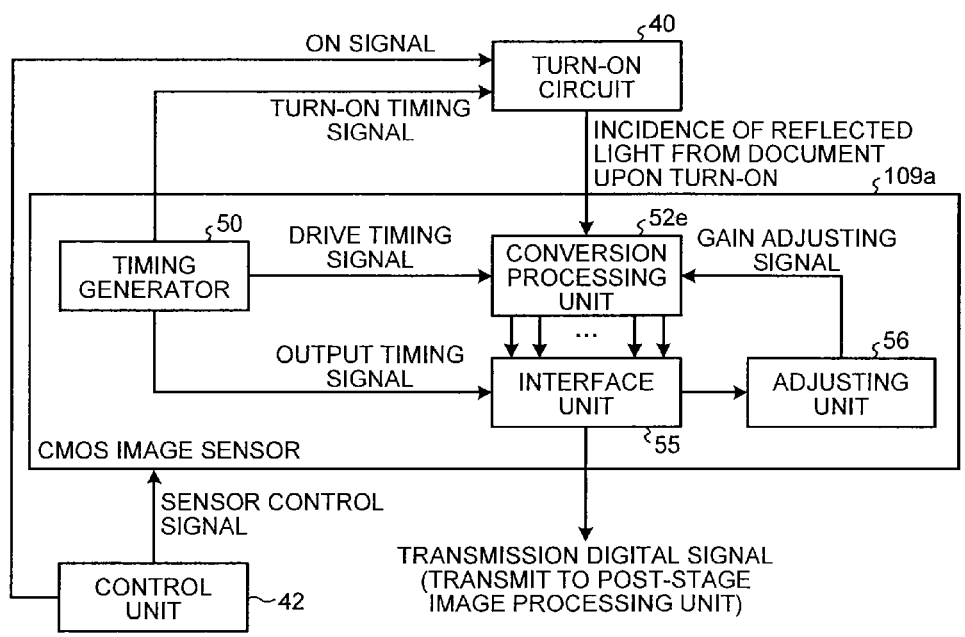
FIG. 16 is a block diagram illustrating an overall structure of modification of the CMOS image sensor.

Next, a modification of the CMOS image sensor 109 will be described. FIG. 16 is a block diagram illustrating an overall modification (CMOS image sensor 109a) of the CMOS image sensor 109. In addition to the functions included in the CMOS image sensor 109 of FIG. 3, the CMOS image sensor 109a includes an adjusting unit 56 configured to adjust a gain in the conversion processing unit 52e. An I/F unit 55 outputs, in addition to the function included in the I/F unit 54, a signal received from the conversion processing unit 52e to the adjusting unit 56.

The adjusting unit 56 adjusts the gain setting of each APGA 524 and DPGA 528 according to the signal received via the I/F unit 55.

Figure 17:
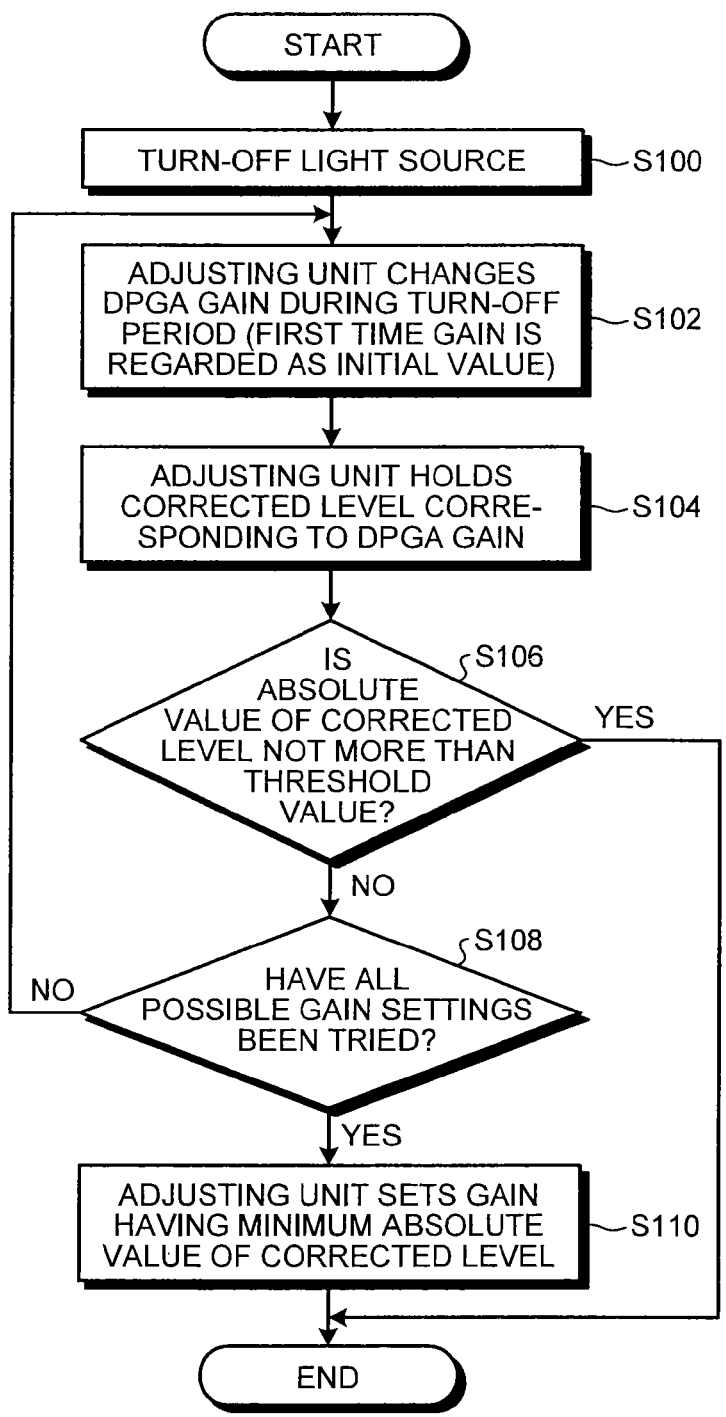
FIG. 17 is a flowchart illustrating an operation of the image reading apparatus during performance of gain adjustment.

FIG. 17 is a flowchart illustrating an operation of the image reading apparatus 100 including the CMOS image sensor 109a during the performance of gain adjustment. The image reading apparatus 100 including the CMOS image sensor 109a sets a fixed gain of the DPGA 528 during the turn-on period, while adjusting the gain of the DPGA 528 during the turn-off period.

In step 100 (S100), the control unit 42 turns off the light source 102 by negating the ON signal.

In step 102 (S102), the adjusting unit 56 sets (changes) the gain of the DPGA 528 during the turn-off period. A first gain setting value of the DPGA 528 is regarded as an initial value.

In step 104 (S104), the adjusting unit 56 obtains the gain setting value of the DPGA 528 and a corrected level corresponding to the obtained gain setting value. As the light source 102 is turned-off, both the optical signal level and the black level to be input to the second black correction unit 529b are regarded as the dark current noise. Therefore, if the gain setting is proper, the corrected level is close to zero.

In step 106 (S106), the adjusting unit 56 determines whether an absolute value of the corrected level is not more than a predetermined threshold value. If the adjusting unit 56 determines that the absolute value of the corrected level is not more than the predetermined threshold value (S106: Yes), the process ends. Meanwhile, if the adjusting unit 56 determines that the absolute value of the corrected level is not less than the predetermined threshold value (S106: No), the process proceeds to S108.

In step 108 (S108), the adjusting unit 56 determines whether possible all gain settings have been tried. If the adjusting unit 56 does not determines that the possible all gain settings have been tried (S108: No), the process proceeds to S102. Meanwhile, if the adjusting unit 56 determines that the possible all gain settings have been tried (S108: Yes), the process proceeds to S110.

In step 110 (S110), the adjusting unit 56 provides a gain setting so as to make a minimum absolute value of the corrected level, and the adjustment ends.

The image reading apparatus 100 including the CMOS image sensor 109a can provide a gain setting according to the condition of the CMOS image sensor 109a or the like by performing the operation illustrated in FIG. 17 upon turn-on of the power supply.

Modification of the second black correction unit 529b

Figure 18:
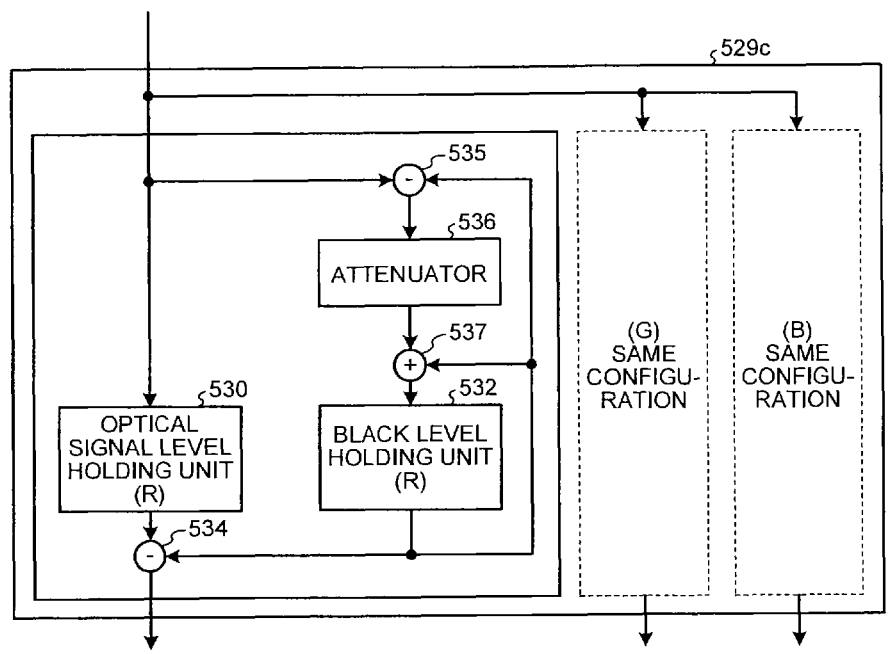
FIG. 18 is a block diagram illustrating an overall structure of a modification of a second black correction unit.

Next, a modification of the second black correction unit 529b will be described. FIG. 18 is a block diagram illustrating an overall structure of a modification (second black correction unit 529c) of the second black correction unit 529b. As illustrated in FIG. 18, the second black correction unit 529c differs from the black correction unit 527 (second black correction unit 529b) of FIG. 12 in that the subtracting unit 535, an attenuator 536, and an adding unit 537 are additionally provided for each color.

The subtracting unit 535 takes a difference between the value currently held by the black level holding unit 532 and a value that is newly input, and outputs the difference to the attenuator 536. The attenuator 536 attenuates the input value from the subtracting unit 535 and outputs the attenuated value to the adding unit 537. An attenuation rate of the attenuator 536 is set to such a value as allowing the variations of the dark current noise due to a temperature change. The adding unit 537 adds a value that the black level holding unit 532 currently has to an attenuated value by the attenuator 536, and outputs the addition result to the black level holding unit 532. Thus, the second black correction unit 529c performs smoothing of the corrected level b illustrated in FIG. 15 by updating the value held by the black level holding unit 532.

Specifically, the second black correction unit 529c can restrict the influence of random noise or sudden noise, even when the dark current noise is small in a short turn-off period of the light source 102 to obtain the black level.

According to the embodiments, it is possible to provide the effect that a black level can be corrected without generating a correction error between colors at approximately the same pixel position.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An imaging device comprising:
a plurality of photoelectric conversion elements that are arranged unidirectionally for each color of light to be received, and that perform photoelectric conversion of reflected light from an approximately same position of an object to be read for the each color sequentially pixel by pixel; and
a black correction unit that corrects a black level of the object to be read with respect to a pixel group including some of the photoelectric conversion elements to perform photoelectric conversion of reflected light from an approximately same position for the each color in a way that an output result of the photoelectric conversion of reflected light by a photoelectric conversion element for a pixel, independent of the reflected light, is subtracted from another output result of photoelectric conversion of reflected light by the photoelectric conversion element for the same pixel.

2. The imaging device according to claim 1, wherein the black correction unit corrects the black level of the object to be read for the each color arranged unidirectionally.

3. The imaging device according to claim 1, further comprising:
an analog-to-digital converter that digitizes output results of the photoelectric conversion by the some of the photoelectric conversion elements for each pixel group, wherein
the black correction unit corrects the black level of the object to be read by using the output results digitized by the analog-to-digital converter.

4. The imaging device according to claim 1, further comprising an amplifying unit that amplifies the output results of the photoelectric conversion by the some of the photoelectric conversion elements for each pixel group according to setting, and outputs the amplified output results to the analog-to-digital converter.

5. An image reading apparatus comprising:
the imaging device according to claim 1;
a light source that emits light to a document as the object to be read; and
a control unit that controls the black correction unit to correct the black level of the document each time the imaging device receives reflected light from a single line of the document in a main-scanning direction.

6. The image reading apparatus according to claim 5, wherein
the control unit causes the light source to be turned on and off sequentially within a period when the imaging device receives the reflected light from the single line of the document in the main-scanning direction, and
the black correction unit corrects the black level of the object to be read with respect to the pixel group in a way that an output result of the photoelectric conversion element during a period when the light source is turned off is subtracted from another output result of the photoelectric conversion of the reflected light by the same photoelectric conversion element.

7. The image reading apparatus according to claim 5, wherein the imaging device is a CMOS sensor.

8. The image reading apparatus according to claim 6, further comprising an adjusting unit that adjusts the black level of the photoelectric conversion elements during the period when the light source is turned off, according to a ratio of a turn-on period to a turn-off period of the light source, wherein
the black correction unit corrects the black level of the object to be read with respect to the pixel group in a way that an output result adjusted by the adjusting unit is subtracted from another output result of the photoelectric conversion of the reflected light by the same photoelectric conversion element.

9. The image reading apparatus according to claim 8, wherein the adjusting unit performs adjustment upon turn-on of a power supply.

10. The image reading apparatus according to claim 5, wherein the black correction unit subtracts the black level of the photoelectric conversion elements by smoothing the black level from the another output result of the photoelectric conversion of the reflected light by the photoelectric conversion element.

11. An image forming apparatus comprising:
the image reading apparatus according to claim 5; and
an image forming unit that forms an image read by the image reading apparatus.

12. An image reading method comprising:
performing photoelectric conversion of reflected light from an approximately same position of an object to be read for each color sequentially pixel by pixel by a plurality of photoelectric conversion elements arranged unidirectionally for each color of light to be received; and
correcting a black level of the object to be read with each pixel group including some of the photoelectric conversion elements to perform photoelectric conversion of reflected light from an approximately same position for the each color in a way that an output result of the photoelectric conversion of reflected light by a photoelectric conversion element for a pixel, independent of the reflected light, is subtracted from another output result of photoelectric conversion of reflected light by the photoelectric conversion element for the same pixel.

* * * * *